United States Patent [19]

Ehrlich

[11] Patent Number: 5,545,330
[45] Date of Patent: Aug. 13, 1996

[54] WATER TREATMENT SYSTEM

[75] Inventor: Robert T. Ehrlich, Edison, N.J.

[73] Assignee: Amerada Hess Corporation, Woodbridge, N.J.

[21] Appl. No.: 347,856

[22] Filed: Dec. 1, 1994

[51] Int. Cl.$^6$ ................. C02F 9/00; C02F 1/24; C02F 1/28
[52] U.S. Cl. ............. 210/703; 210/663; 210/664; 210/669; 210/708; 210/804; 210/806; 210/908; 210/909; 210/202; 95/165; 95/170; 95/205
[58] Field of Search ............... 210/663, 664, 210/669, 703, 708, 754, 764, 804, 806, 908, 909, 747, 170, 694, 202; 95/165, 170, 205

[56] References Cited

U.S. PATENT DOCUMENTS

| | | |
|---|---|---|
| 2,730,190 | 1/1956 | Brown et al. ............... 183/2.7 |
| 2,766,203 | 10/1956 | Brown et al. ............... 210/16 |
| 2,948,677 | 8/1960 | Austin . |
| 3,565,252 | 2/1971 | Sheehy ................... 210/104 |
| 3,576,738 | 4/1971 | Duffy . |
| 3,617,539 | 11/1971 | Grutsch . |
| 3,707,464 | 12/1972 | Burns . |
| 4,073,722 | 2/1978 | Grutsch . |
| 4,094,783 | 6/1978 | Jackson . |
| 4,139,463 | 2/1979 | Murphy et al. ............ 210/73 |
| 4,168,228 | 9/1979 | Mallatt . |
| 4,172,781 | 10/1979 | Walk . |
| 4,179,369 | 12/1979 | Bradley . |
| 4,198,300 | 4/1980 | Williams . |
| 4,292,176 | 9/1981 | Grutsch . |
| 4,314,906 | 2/1982 | Dunn . |
| 4,544,488 | 10/1985 | O'Brien . |
| 4,572,786 | 2/1986 | Endo . |
| 4,608,168 | 8/1986 | Moore . |
| 4,696,739 | 9/1987 | Pedneault . |
| 4,764,272 | 8/1988 | Fox . |
| 4,889,638 | 12/1989 | Rockford . |
| 4,997,571 | 3/1991 | Roensch . |
| 5,122,165 | 6/1992 | Wang . |
| 5,171,334 | 12/1992 | Kabis . |
| 5,173,092 | 12/1992 | Rudder . |
| 5,227,071 | 7/1993 | Torline et al. ............ 210/651 |
| 5,236,595 | 8/1993 | Wang . |
| 5,256,299 | 10/1993 | Wang . |
| 5,302,294 | 4/1994 | Schubert et al. .......... 210/702 |

FOREIGN PATENT DOCUMENTS

92/20624  11/1992  WIPO .

Primary Examiner—Thomas M. Lithgow
Attorney, Agent, or Firm—Vinson & Elkins L.L.P.

[57] ABSTRACT

A water treatment system and process separates contaminants from water by flotation, by forming a removable floating scum of impurities utilizing a bubbling process, by filtering out suspended solids, by stripping dissolved impurities from the water with air, by oxidizing organic compounds, by adsorbing organic compounds, and finally, by disinfecting. Utilization of the disclosed process and system will transform contaminated water into an environmentally suitable state.

24 Claims, 2 Drawing Sheets

WATER TREATMENT SYSTEM

BACKGROUND OF THE INVENTION

The present invention relates to water treatment systems; more particularly, the present invention relates to systems which make environmentally suitable water from water which has been contaminated with hydrocarbons and other substances.

In many situations, typically involved with the production, refining, transportation or storage of hydrocarbon products, there is the possibility of contaminating local groundwater with tank-cleaning runoff, spillage or leaks. In such situations, it may become necessary to process or purify contaminated local groundwater to return it to an environmentally suitable state.

While numerous systems for treating contaminated water have been proposed, no one treatment system has been effective to consistently and economically transform contaminated water to an environmentally suitable state.

Examples of prior art water treatment systems may be found in the following U.S. Patents:

U.S. Pat. No. 2,730,190 to Brown et al. relates to the treatment of water which contains oil. Herein, a combination oil washing and gas flotation process is used for the removal and recovery of oil and solids from streams of water. The contaminated stream of water is first subjected to an optional gas removing step. The treated water is then contacted with a stream of finely dispersed gas bubbles produced by means of a jet flotation device.

In U.S. Pat. No. 2,766,203 to Brown et al., a water purification process and apparatus is disclosed. Herein, a multi-zoned floatation system is used for the treatment of oil-contaminated water streams.

U.S. Pat. No. 3,565,252 to Sheehy et al. discloses a system for the processing of fluids used to wash oil tanks in ocean-going vessels.

In U.S. Pat. No. 5,227,071 to Torline et al., a five-stage treatment system for treating oily wastewater is disclosed. Herein, a coalescer is used for separating free oil, an ultrafiltration unit is used for separating emulsified oil, an activated carbon filter is used for separating residual light organic compounds, a Cat-ion exchanger is used for removing heavy metal ions, a pH adjusting unit is used for adjusting the pH of the treated water, and a controller is used for regulating the operation of the entire system.

U.S. Pat. No. 4,139,463 to Murphy et al. relates only to an oil-and-water separation system.

In U.S. Pat. No. 5,302,294 to Schubert et al., a separator system employing degassing separators and hydrocyclones is disclosed. The invention is directed to the use of a hydrocyclone at an early stage in the separation process. The hydrocyclone separator is then used in conjunction with an initial gravity separator, or in some instances, the hydrocyclone separator is employed as the first separator.

While the foregoing systems teach the removal of contaminants from water, each has its limitations with regard to producing environmentally suitable water. Therefore, the need remains in the art for a treatment system which will consistently and economically transform contaminated water into an environmentally suitable state.

SUMMARY OF THE INVENTION

The water treatment system and process of the present invention consistently and economically produces environmentally suitable water from contaminated water. Such water treatment is accomplished by first passing the contaminated water through a gravity separator. Such separators utilize the difference in densities between water and separate phase contaminants to enable those contaminants whose densities are less than the density of the contaminated water to float to the top of the water. Once the contaminants come together on top of the water, the contaminants are skimmed off and disposed of.

The second treatment step separates neutral buoyancy dispersed hydrocarbons and fine solids from the contaminated water. Gas, typically air, is bubbled through the contaminated water. As the bubbles rise through the contaminated water, they pick up neutral buoyancy dispersed hydrocarbons and fine solids. The contaminant-laden bubbles form a floating scum on the top of the water. Once formed, the floating scum is removed from the top of the water and properly disposed of.

The third treatment step is gravity filtration wherein the contaminated water is mechanically filtered by passing it through a filter media of gravel, sand and granular anthracite. While this step removes contaminants not removed in the first two steps, it also increases the effective operation time between cleaning requirements of the air stripping equipment utilized in the following step.

Dissolved volatile organic impurities such as benzene, ethylbenzene, toluene and xylene are removed from the contaminated water in the fourth treatment step, an air or gas stripping process. In this treatment step numerous small droplets of water are formed on a plurality of small surfaces within the stripper tank. As pressurized air or gas is caused to pass through the water, the dissolved organic impurities are picked up and carried away from the water droplets. Heating the air or gas increases the contaminant removing effectiveness of this step.

A fifth optional treatment step oxidizes any remaining dissolved organic compounds within the contaminated water and enhances the effectiveness of the carbon adsorption treatment step which follows. In the preferred embodiment, an ozone oxidation process is used.

Finish processing of the contaminated water is a two-step operation. First, contaminants such as pesticides, chlorinated solvents and other dissolved organic compounds are removed by carbon adsorption which occurs when the contaminated water passes through a bed of activated charcoal. Then, in the second finishing step, any remaining biologically active organisms are treated with chlorine or other suitable disinfecting chemicals.

BRIEF DESCRIPTION OF THE DRAWINGS

A better understanding of the water treatment process and system of the present invention may be had by reference to the drawings wherein.

BRIEF DESCRIPTION OF THE EMBODIMENTS

Figure 1:
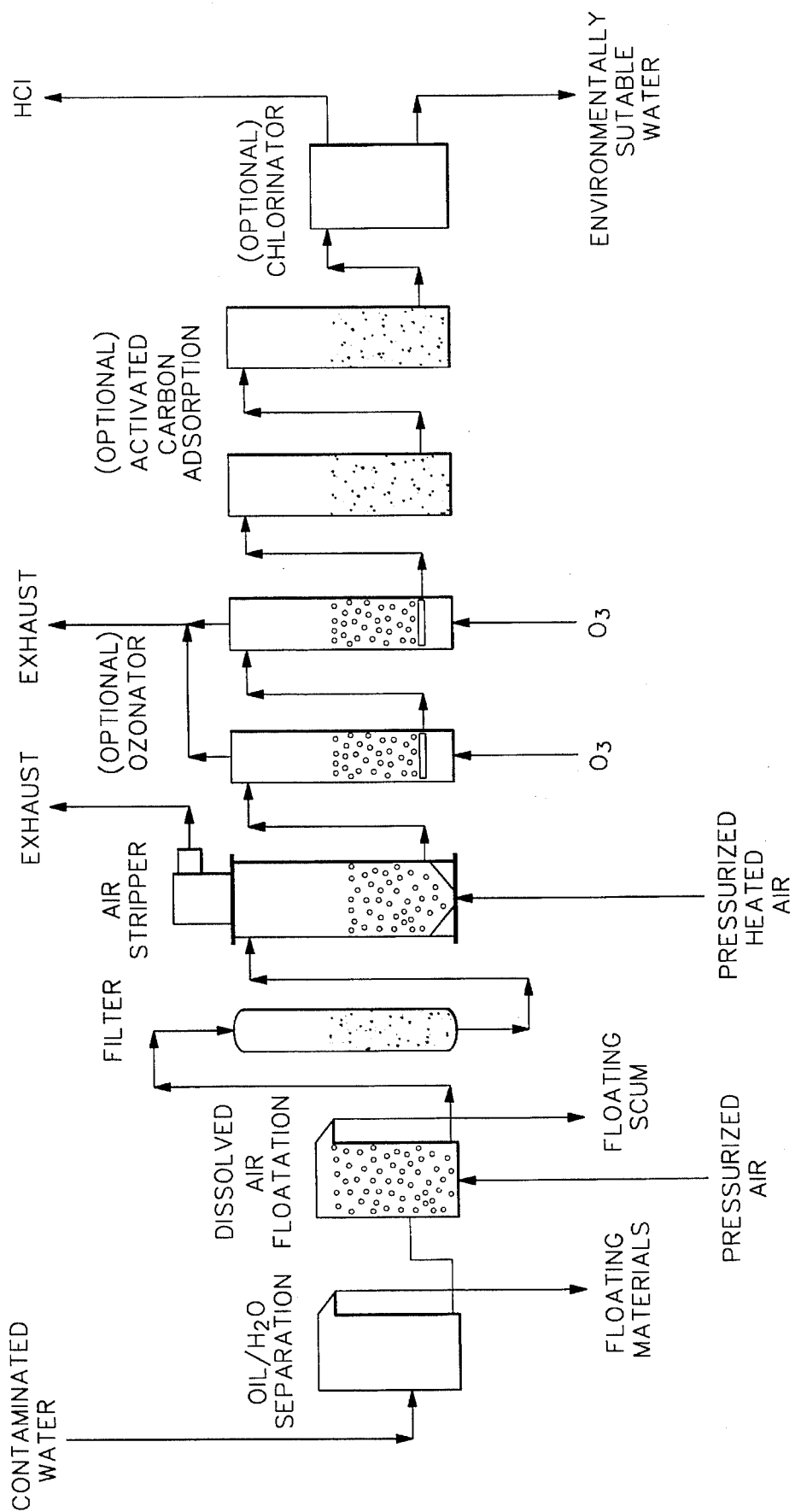
FIG. 1 is a schematic diagram illustrating the various steps of the water treatment process of the present invention.

The basic steps in the water treatment process of the present invention are illustrated in FIG. 1. Seven steps, as described below, are included in the preferred embodiment.

Gravity Oil/Water Separator

Water contaminated with dissolved and free hydrocarbons is first delivered to a gravity oil/water separator. The gravity oil/water separator utilizes the difference in densities between oil and other contaminants oil and water to separate out free phase hydrocarbons and other floating contaminants. Herein the bulk of the undissolved oil and other floating contaminants are removed from the contaminated water by allowing them to float to the top of the water and then run off. Emulsified and dissolved oils are removed from the water in subsequent steps.

Oil/water separators are typically used in refineries for skimming free phase hydrocarbons from the top of water.

Air Flotation

Contaminated water from the gravity oil/water separation system is next delivered to an air flotation treatment step. Herein air flotation is used to remove dispersed oil and very fine solids which might otherwise remain in suspension in the contaminated water. In the air flotation step, minute air bubbles are introduced into the contaminated water to induce a swirling motion. As these minute bubbles rise through the swirling water, oil droplets and suspended solids adhere to the air bubbles. These minute air bubbles float to the surface of the contaminated water where they form a scum. This scum is removed from the top of the water by causing it to pass through a weir. The scum is then properly disposed of.

While air is used in the preferred embodiment, it will be understood that gases other than air may be used to form a scum with the same result. Such gases are well-known to those of ordinary skill in the art.

The air flotation treatment step is particularly useful in removing those contaminants which remain in colloidal suspension in contaminated water.

Gravity Filtration

The third treatment step is gravity filtration. In the gravity filter, suspended solids still remaining in the contaminated water are mechanically removed. Gravity filtration has also been found to be effective in removing small quantities of oil.

The filter tank contains a filter media bed of granular anthracite coal, gravel and sand. When the filtering media bed becomes clogged with contaminants, it may be easily cleaned by backwashing. It has also be found that by forcing air or gas up through the filtering media bed, the granular anthracite coal, gravel and sand can be kept as a loose mixture. A loose bed of filtering media enhances the flow of water through the gravity filter. It has been found that such utilization of air to keep the filtering media bed loose does not reduce its filtering effectiveness. Gravity filtration at this point in the system is also important to protect the equipment used in the following air stripping treatment step.

Air Stripping

In air stripping, dissolved volatile organic compounds such as benzene, ethylbenzene, toluene and xylene are placed in intimate contact with air to remove these contaminants from the water. To effectively bring the contaminated water and air into intimate contact, the contaminated water flows through a bed of honeycomb packing material. The honeycomb packing material disperses the contaminated water into many small droplets. A large quantity of air is then blown through the honeycomb packing material in a direction opposite to the flow of contaminated water. The dissolved volatile organic contaminants are then transferred from the contaminated water droplets to the air. The contaminants are then carried upward through the tank, eventually exiting the tank through the exhaust air vent. The air stripping process is enhanced if the air or gas utilized in this process is heated before it is passed through the tank holding the contaminated water. While air has been utilized in the preferred embodiment, it will be understood that a variety of different gases may be used instead of air. Such gases are well-know to those of ordinary skill in the art.

Ozonation

After the air stripping treatment step, and if further adsorption of dissolved contaminants is required, the contaminated water may be treated with ozone. In some situations, the treating of contaminated water with ozone may not be necessary. Ozone is a highly reactive oxidizer which is used to disinfect, control taste, control odor, remove color and oxidize dissolved chemicals in the contaminated water. While ozone gas has been selected as the preferred oxidizer, it will be well understood by those of ordinary skill in the art that numerous other methods of oxidizing dissolved chemical contaminants may be used without departing from the scope of the present invention.

Carbon Adsorption

If further adsorption of dissolved contaminants is still required, the water next passes through a carbon adsorption treatment step. In some situations, the treatment of contaminated water by carbon adsorption may not be necessary. The carbon adsorption process is used when it is necessary to remove soluble organic compounds from the contaminated water which have not been removed by earlier purification steps. Herein water is passed through beds of activated carbon granules. Soluble organic compounds are adsorbed on the activated carbon particles.

Chlorination

Finally, if necessary, any remaining biologically active contaminants in the contaminated water are treated with chlorine. As chlorine is used to kill living bacteria, treatment with chlorine may not be necessary if the amounts of living bacteria have been reduced to acceptable levels. Those of ordinary skill in the art will understand that while treatment of the contaminated water with chlorine is shown as part of the preferred embodiment, numerous other methods of bacterially disinfecting the contaminated water may be used without departing from the scope of the present invention.

Operation of the Preferred Embodiment

Figure 2:
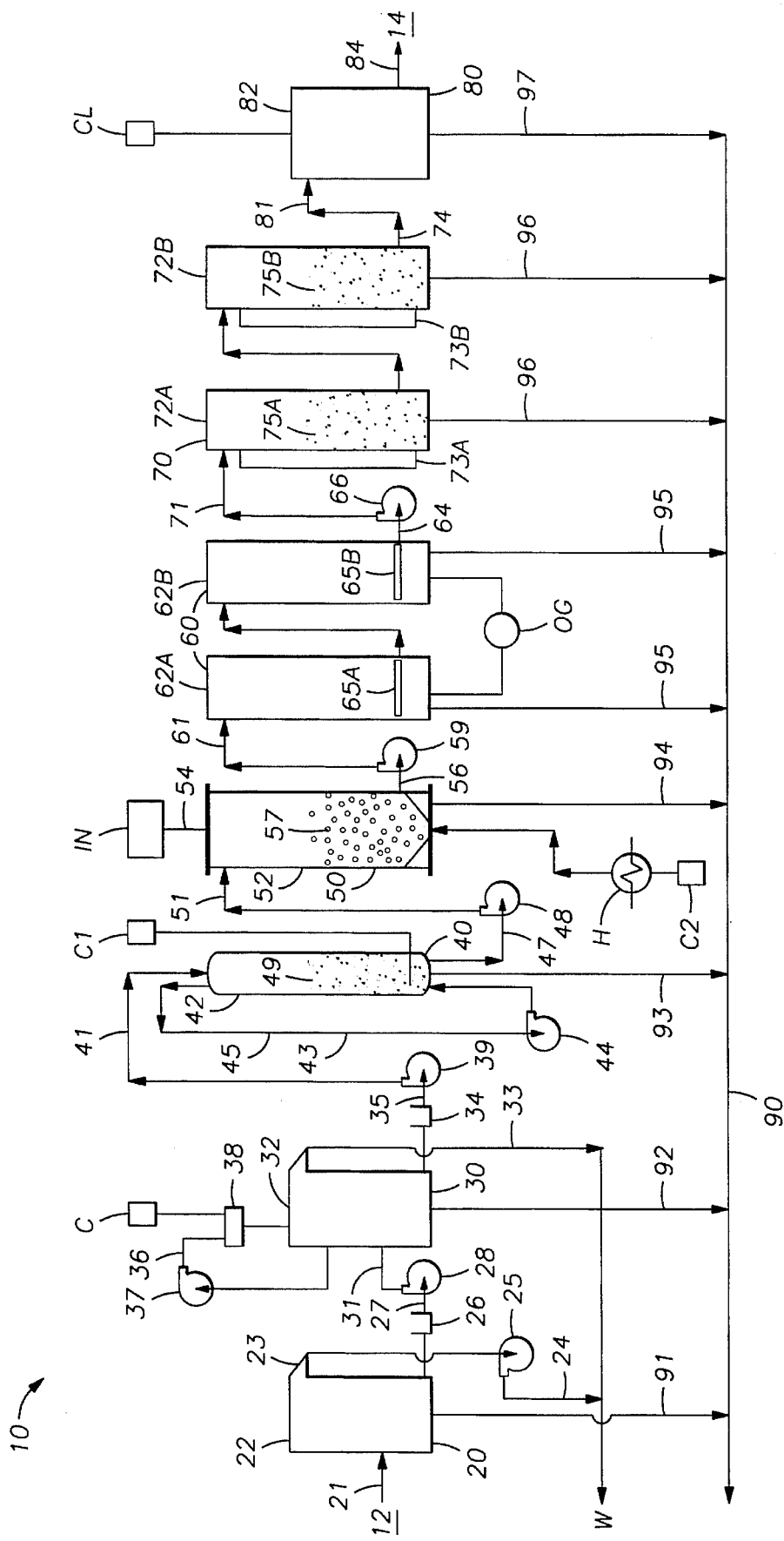
FIG. 2 expands on the schematic of FIG. 1 to show additional system components utilized in the preferred embodiment.

The preferred embodiment of the water treatment system 10 of the present invention may be seen by reference to FIG. 2. Contaminated water 12 enters the oil/water separator system 20 through inlet 21, connected to tank 22. Floating contaminants are removed from the water by causing them to flow over weir 23 and thence through discharge system 24 for pumping 25 to a waste disposal facility W. Water then exits tank 22. If needed, an equalization tank 26 may be used to control the flow rate of the water. Equalization tank outlet 27 conducts the water through pump 28 where it passes to air flotation system 30.

In air flotation system 30, water enters tank 32 through inlet 31. Recirculating system 36 combines recirculated water from pump 37 with compressed air from compressor C in manifold 38. This recirculation action causes a froth or scum to form on the top of the water. The froth or scum skimmed off the top of the water by discharge system 33 exits to waste disposal facility W. Optional flow rate equalization tank 34 is found at the outlet side of system 30. To maintain the flow of water, tank 34 is connected to pump 39 by outlet 35.

The water next passes to gravity filter system 40 through inlet 41 and thence into tank 42. Filter system 40 may be cleaned by backwash system 43 which includes pump 44 and appropriate piping 45 connecting the bottom of tank 42 with the top of tank 42. After the water has passed through filtration system 40, it exits through outlet 47 and thence to pump 48 on its way to air stripping system 50. It has been found in the preferred embodiment that if air from compressor C1 is caused to pass upwardly through the sand, gravel and granular anthracite filter bed 49 of filter system 40, flow rates are increased because the filtering media 49 does not become packed together.

Water next enters air Stripping system 50 through inlet 51 which conducts the water into tank 52. Air compressor C2 supplies pressurized air which passes through optional heater H to the interior of tank 52. Honeycomb material 57 provides a plurality of surfaces to facilitate formulation of water droplets. Air, passing by the water droplets, removes dissolved organic contaminants such as benzene, ethylbenzene, toluene and xylene from the droplets of water. The contaminant-laden air then passes through exhaust vent 54 and thence on to a catalytic incinerator IN. The water, having completed its treatment in air stripper system 50, passes through outlet 56 and thence to pump 59 on its way to ozonation system 60.

It has been found that in certain limited applications, the quality of the water exiting air stripping system 50 is environmentally suitable. In such case, the remaining three steps may be eliminated.

Water enters ozonation system 60 through inlet 61 and then flows through a series of tanks 62A and 62B. While two tanks are shown in the illustrated embodiment, the actual number of tanks used may vary, depending on water quality. The required ozone gas is obtained from an electric ozone generator OG. Ozone gas is bubbled through the water in tanks 62A and 62B. Bubble generators 65A and 65B are placed in the bottom of tanks 62A and 62B, respectively, to provide a wide dispersion of ozone bubbles throughout the contaminated water. Once exiting ozonation system 60, the contaminated water passes through outlet 64 and thence to pump 66 before traveling to carbon adsorption system 70.

The inclusion of ozonation system 60 enhances the effectiveness of carbon adsorption. Thus, if the quality of the water exiting the carbon adsorption system 70 is environmentally suitable, it may be possible to eliminate ozonation system 60.

Water enters carbon adsorption system 70 through inlet 71 and thence into a series of tanks designated by 72A and 72B. While two tanks are shown in the illustrated embodiment, the actual number of tanks used may vary, depending on water quality. To keep the carbon adsorption material 75A and 75B clean, backflush systems 73A and 73B are used. Once the water has passed through carbon adsorption system 70, water exits through outlet 74 and thence through inlet 81 into chlorinator system 80.

In chlorinator system 80, the water now in tank 82 is intermixed with a disinfecting agent such as chlorine from supply CL. Once properly treated, environmentally suitable water 14 exits through outlet 84. When low levels of biologically active contaminants are present in the water, it may be possible to eliminate chlorinator system 80 entirely.

The effectiveness of the water treatment system 10 of the present invention may allow it to be used for producing potable water such as when the water being processed is removed from tanks which once contained petroleum products.

In the preferred embodiment of FIG. 2, a drain system 90 is shown. Drain system 90 consists of a pipe which connects to branch 91 from oil/water separator tank, branch 92 from dissolved air flotation tank 20, branch 93 from filter 40, branch 94 from air stripper system 50, branch 95 from ozonator 60, branch 96 from carbon adsorption system 70, and branch 97 from chlorinator system 80.

There is hereby provided by the water treatment system 10 of the present invention a method and system for transforming contaminated water into an environmentally suitable state.

Those of ordinary skill in the art, having read the foregoing disclosure, will realize that numerous other embodiments of the invention are made apparent by the foregoing disclosure. Such other embodiments shall be included within the scope of the appended claims.

What is claimed is:

1. A process for transforming contaminated water to an environmentally suitable state comprising the steps of:

separating free-phase hydrocarbons and other floating contaminants from the contaminated water by using the difference in density of the free-phase hydrocarbons, the other floating contaminants and the contaminated water;

subjecting the contaminated water from which free-phase hydrocarbons have been substantially removed to a second step by separating dispersed hydrocarbons, fine solids and dissolved impurities from the contaminated water by bubbling gas through the contaminated water to form a floating scum of dispersed hydrocarbons, fine solids and dissolved impurities and then removing said floating scum;

subjecting the contaminated water from which dispersed hydrocarbons have been substantially removed to a third step by separating solid and liquid impurities from the contaminated water by filtration; and subjecting the contaminated water from which solid and liquid impurities have been substantially removed to a fourth step by separating dissolved volatile organic impurities from the contaminated water by a gas stripping process.

2. The process as defined in claim 1 wherein the step of separating free phase hydrocarbons and other floating contaminants from the contaminated water is accomplished by an oil/water separator where the hydrocarbons and other floating contaminants are skimmed off the top of the water.

3. The process as defined in claim 1 wherein the step of separating dispersed hydrocarbons, fine solids and dissolved impurities from the contaminated water further includes causing the water to swirl within its container.

4. The process as defined in claim 1 wherein the step of separating solid and liquid impurities from the contaminated water by filtration utilizes a sand, gravel and granular anthracite filter.

5. The process as defined in claim 4 further including bubbling compressed gas through the sand, gravel and granular anthracite.

6. The process as defined in claim 1 wherein the gas stripping process utilizes heated gas.

7. The process as defined in claim 6 wherein the gas is air.

8. A process for transforming contaminated water to an environmentally suitable state comprising the steps of:

separating free-phase hydrocarbons and other floating contaminates from the contaminated water by using the difference in density of the free-phase hydrocarbons, the other floating contaminates, and the contaminated water;

subjecting the contaminated water from which free-phase hydrocarbons have been substantially removed to a second step by separating dispersed hydrocarbons, fine solids and dissolved impurities from the contaminated water by bubbling gas through the contaminated water to form a floating scum of dispersed hydrocarbons, fine solids and dissolved impurities and then removing said floating scum;

subjecting the contaminated water from dispersed hydrocarbons have been substantially removed to a third step by separating solid and liquid impurities from the contaminated water by filtration;

subjecting the contaminated water from which solid and liquid impurities have been substantially removed to a fourth step by separating dissolved volatile organic impurities from the contaminated water by a gas stripping process; and subjecting the contaminated water from which dissolved impurities have been substantially removed to a fifth step by separating absorbing soluble organic compounds remaining in the contaminated water.

9. The process as defined in claim 8 wherein the step of separating free phase hydrocarbons and other floating contaminants from the contaminated water is accomplished by an oil/water separator where the hydrocarbons and other floating contaminants are skimmed off the top of the water.

10. The process as defined in claim 8 wherein the step of separating dispersed hydrocarbons, fine solids and dissolved impurities from the contaminated water further includes causing the water to swirl within its container.

11. The process as defined in claim 8 wherein the step of separating solid and liquid impurities from the contaminated water by filtration utilizes a sand, gravel and granular anthracite filter.

12. The process as defined in claim 11 further including bubbling compressed gas through the sand, gravel and granular anthracite.

13. The process as defined in claim 8 wherein the gas stripping process utilizes heated gas.

14. The process as defined in claim 13 wherein the gas is air.

15. The process as defined in claim 8 wherein the adsorption step utilizes activated charcoal.

16. A process for transforming contaminated water to an environmentally suitable state comprising the steps of:

separating free-phase hydrocarbons and other floating contaminates from the contaminated water by using the difference in density of the free-phase hydrocarbons, the other floating contaminates, and the contaminated water;

subjecting the contaminated water from which free-phase hydrocarbons have been substantially removed to a second step by separating dispersed hydrocarbons, fine solids and dissolved impurities from the contaminated water by bubbling gas through the contaminated water to form a floating scum of dispersed hydrocarbons, fine solids and dissolved impurities and then removing said floating scum;

subjecting the contaminated water from dispersed hydrocarbons have been substantially removed to a third step by separating solid and liquid impurities from the contaminated water by filtration;

subjecting the contaminated water from which solid and liquid impurities have been substantially removed to a fourth step by further separating dissolved volatile organic impurities from the contaminated water by using a gas stripping process;

subjecting the contaminated water from which dissolved impurities have been substantially removed to a fifth step by separating absorbing soluble organic compounds remaining in the contaminated water; and subjecting the contaminated water from which soluble organic compounds have been substantially removed to a sixth step by disinfecting the contaminated water.

17. The process as defined in claim 16 wherein the step of separating free phase hydrocarbons and other floating contaminants from the contaminated water is accomplished by an oil/water separator where the hydrocarbons and other floating contaminants are skimmed off the surface of the water.

18. The process as defined in claim 16 wherein the step of separating dispersed hydrocarbons, fine solids and dissolved impurities from the contaminated water further includes causing the water to swirl within its container.

19. The process as defined in claim 16 wherein the step of separating solid and liquid impurities from the contaminated by filtration utilizes a sand, gravel and granular anthracite filter.

20. The process as defined in claim 19 further including bubbling compressed gas through the sand, gravel and granular anthracite.

21. The process as defined in claim 16 wherein the gas stripping step utilizes heated gas.

22. The process as defined in claim 21 wherein the gas is air.

23. The process as defined in claim 16 wherein the adsorption step utilizes activated charcoal.

24. The process as defined in claim 16 wherein the disinfecting step utilizes chlorine.

\* \* \* \* \*